United States Patent
Cho et al.

(10) Patent No.: US 7,535,919 B2
(45) Date of Patent: May 19, 2009

(54) WIRELESS COMMUNICATION METHOD ADAPTING PRIORITY FOR TRANSMITTING PACKETS IN WPAN

(75) Inventors: Jun-haeng Cho, Seoul (KR); Won-yong Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 11/025,078

(22) Filed: Dec. 30, 2004

(65) Prior Publication Data

US 2005/0141547 A1    Jun. 30, 2005

(30) Foreign Application Priority Data

Dec. 31, 2003    (KR) .................... 10-2003-0101716

(51) Int. Cl.
*H04L 12/413* (2006.01)
(52) U.S. Cl. ............... 370/448; 370/252; 370/443; 370/450; 370/462; 370/466
(58) Field of Classification Search .......... 370/252, 370/253, 443, 448, 450, 458, 462, 466
See application file for complete search history.

(56) References Cited

U.S. PATENT DOCUMENTS 5,355,516 A * 10/1994 Herold et al. ............. 455/510
6,674,765 B1 * 1/2004 Chuah et al. .............. 370/458
7,065,065 B2 * 6/2006 Dick et al. ................. 370/335
2003/0152059 A1 * 8/2003 Odman ..................... 370/338

FOREIGN PATENT DOCUMENTS

| JP | 11-55266 A | 2/1999 |
| JP | 2001-237839 A | 8/2001 |
| WO | 02/103943 A1 | 12/2002 |
| WO | 03/077483 A1 | 9/2003 |

\* cited by examiner

*Primary Examiner*—Ricky Ngo
*Assistant Examiner*—David Oveissi
(74) *Attorney, Agent, or Firm*—Sughrue Mion, PLLC

(57) ABSTRACT

A wireless communication method in a network environment in which several devices are connected and wireless communications are performed through a channel synchronized by a sync signal that is broadcast from a piconet coordinate (PNC) selected among the several devices. The wireless communication method includes classifying a first frame to be transmitted to a first device among the several devices into a predetermined number of classes, calculating a waiting time before backoff depending on the classes, and determining whether the channel is used by any other device during the calculated waiting time, calculating a backoff time according to the classes and performing the backoff during the calculated backoff time, if the channel is idle during the waiting time, and transmitting the first frame when the backoff time ends. By adapting the priority to the CAP of the superframe, the control information is quickly conveyed and a high rate wireless communication is realized.

15 Claims, 3 Drawing Sheets

WIRELESS COMMUNICATION METHOD ADAPTING PRIORITY FOR TRANSMITTING PACKETS IN WPAN

CROSS-REFERENCE TO RELATED APPLICATIONS

This application claims the benefit of Korean Patent Application No. 2003-10716, filed on Dec. 31, 2003 with the Korean Intellectual Property Office, the disclosure of which is incorporated herein by reference in its entirety.

BACKGROUND OF THE INVENTION

1. Field of the Invention

The present invention relates generally to a wireless communication method, and more specifically, to a communication method for transmitting frames by adapting priority in a wireless personal area network (WPAN) based on IEEE 802.15.3 standard.

2. Description of the Related Art

Wireless personal area network (WPAN) enables bidirectional communications amongst devices such as computers, peripherals, mobile terminals, or home appliances within a short distance of 10 m by connecting the devices through wireless networks, and supports various applications. In contrast to local area network (LAN) or wide area network (WAN), the WPAN is one of personal wireless communication networks, not conventional infrastructure networks, to thus implement small, inexpensive, and power efficient solutions. The WPAN may be applied to applications such as, for example, home networks.

Currently, IEEE 802.15.3 Task Group (TG) is developing the WPAN standard. The IEEE 802.15.3 enables high data rate transmission of 11 to 55 Mbps with lower power, and a data transmission range is limited to 10 m. The IEEE 802.15.3, which is in process of standardization by IEEE 802.15.3a TG which specifies WPAN systems using a ultra-wide band system, is to provide a physical layer enhancement to 100 Mbps and aims at applications such as multimedia transmission of wireless videos over a short distant connectivity like home networks.

A unit of the WPAN is a piconet which configures networks, including a piconet coordinator (PNC) and more than one mobile device (DEV) sharing a unique network identifier. The PNC forms a piconet by transmitting beacons, provides a basic communication timing, and provides wireless communication services such as the quality of service (QoS), power save modes, and media access control (MAC).

According to the IEEE 802.15.3 specification, the piconet is formed without pre-planning and for only as long as the piconet is needed. A plurality of DEVs of a piconet respectively and independently share a single medium in a peer-to-peer manner, and communicate with each other in a multihop manner, in which this type of the piconet is also referred to as an ad hoc network.

The multihop manner transmits data packets from a source node to a destination node via the plurality of the DEVs which perform as both a host and a router, in the communications between DEVs over the ad hoc networks. Since the piconet covers at most 10 m, the data packets may not be transmitted directly from the source node to the destination.

Since the DEVs of the piconet communicate by sharing the single medium, communications of each DEV should be allowed with proper timing allocations by controlling access to the medium of each DEV to thus prevent collisions in the DEVs communications.

FIG. 1 is a diagram illustrating an example of the conventional WPAN. Referring to FIG. 1, the WPAN includes a plurality of DEVs 100 to 140. One of the DEVs is a coordinator 100 which broadcasts beacon frames to synchronize the DEVs 110, 120, 130, and 140 of the network. The DEVs 100 to 140 synchronized by the beacons, communicate with each other in the peer-to-peer manner according to the timing based on a superframe within the network.

FIG. 2 is a diagram illustrating a structure of a superframe for the wireless communications in the WPAN according to the IEEE 802.15.3 standard.

Referring to FIG. 2, the superframe includes a beacon period, a contention access period (CAP), and a channel time allocation period (CTAP). A length of the CAP is determined by the PNC and is sent to each DEV during the beacon period.

During the beacon period, information for managing the communications over the entire piconet is transmitted. For example, a sync signal is transmitted for synchronization of each DEV of the WPAN, and the time slot allocation (CTA) is set to each channel.

During the CAP, each DEV contendingly communicates using carrier sense multiple access with collision avoidance (CSMA/CA), and an asynchronous data frame and a command frame are transmitted. The command frame conveys control information such as a request and a response of the communication, a channel time request (CTR), and other control signals.

The CTAP includes a plurality of CTAs and management CTAs (MCTAs), which are exclusively allocated to each channel by the PNC for transmitting data frames, and uses a time division multiple access (TDMA) method. The MCTA is a type of CTA and is used for communications between the PNC and the DEV. Accordingly, if a data rate of PHY is enhanced, high rate transmission of data frames is feasible.

However, a clear channel assessment (CCA) time, a waiting time, and a backoff time for the CSMA/CA of the CAP have fixed values and require a high rate of relative overhead for the frame transmission. Thus, the high rate as in the CTAP is not expected.

The data frame and the command frame are transmitted in equivalent contention during the CAP, to thus considerably delay the transmission of the control information which is a pre-stage of the data transmission for establishing a communication channel. As a result, the delay of the control information degrades high data rate transmission.

SUMMARY OF THE INVENTION

To overcome the above drawbacks of the conventional arrangements, an object of the present invention is to provide a wireless communication method which swiftly transmits the control information by adapting priority for a frame transmission in a WPAN compliant to IEEE 802.15.3 standard.

To achieve the above and other objects and other features of the present invention, in a network environment in which a plurality of devices are connected and wireless communications are performed through a channel synchronized by a sync signal that is broadcast from a piconet coordinate (PNC) selected among the plurality of the devices, the wireless communication method includes classifying a first frame to be transmitted from a first device among the plurality of the devices into a predetermined number of classes, calculating a waiting time before backoff depending on the classes, and determining whether the channel is used by any other device during the calculated waiting time, calculating a backoff time according to the classes and performing the backoff during the calculated backoff time, if the channel is idle during the waiting time, and transmitting the first frame when the backoff time ends.

Advantageously, the network is a high-rate wireless personal area network (WPAN) compliant to one of an IEEE 802.15.3 standard or an IEEE 802.15.3a standard. The classes are classified based on the first frame to be transmitted during a contention access period (CAP) of a superframe and a type of the first device.

Advantageously, the classes are classified in a manner that a higher priority is assigned when the first frame corresponds to a command frame conveying a control information than when the first frame corresponds to a data frame.

Advantageously, the classes are classified in a manner that a higher priority is assigned when the first frame corresponds to a response command frame of the command frame conveying the control information than when the first frame corresponds to a request command frame.

In a descending priority, the classes includes a first class in which the first device is the PNC and the first frame is the response command frame, a second class in which the first device is not the PNC and the first frame is the response command frame, a third class in which the first frame is the request command frame, and a fourth class in which the first frame is the data frame.

Advantageously, the waiting time is calculated so that the correspondent waiting time is lengthened as the priority according to the classes of the first frame is lowered. The BT is calculated so that the correspondent BT is lengthened as the priority according to the classes of the first frame is lowered.

Advantageously, at least one of the waiting time and the BT is lengthened in accordance with increase of the number of the devices accessed to the network.

BRIEF DESCRIPTION OF THE DRAWING FIGURES

These and/or other aspects and advantages of the invention will become apparent and more readily appreciated from the following description of the exemplary embodiments, taken in conjunction with the accompanying drawing figures of which:

DETAILED DESCRIPTION OF THE EMBODIMENTS

Figure 1:
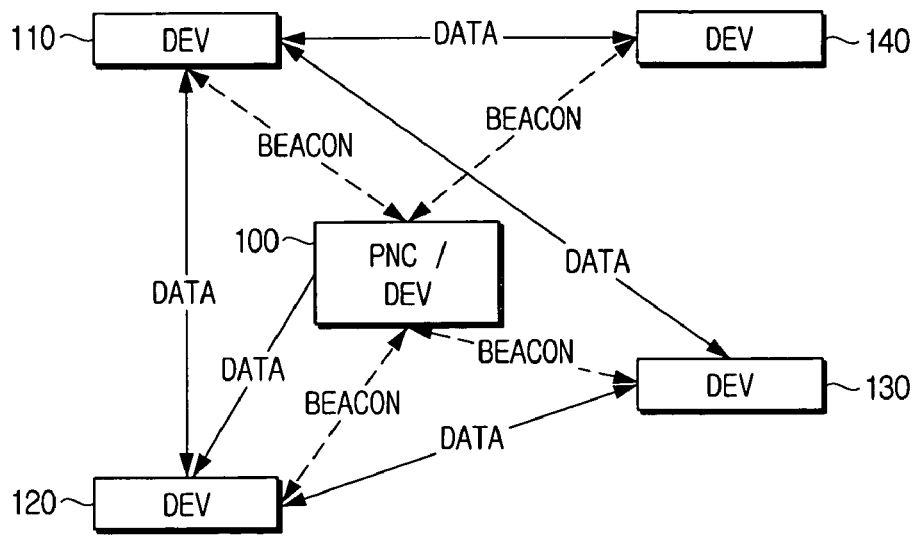
FIG. 1 is a diagram illustrating a configuration of a general wireless personal area network (WPAN)
Figure 2:
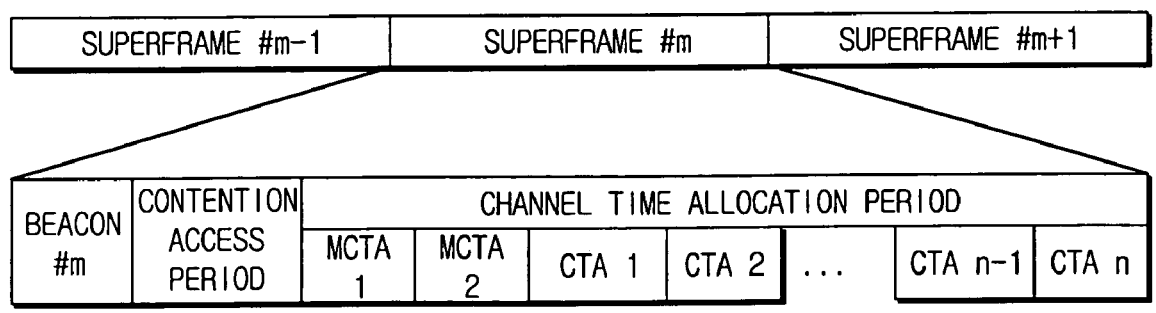
FIG. 2 is a diagram illustrating a structure of a superframe according to an IEEE 802.15.3 standard.

Reference will now be made in detail to the embodiments of the present invention, examples of which are illustrated in the accompanying drawing figures, wherein like reference numerals refer to the like elements throughout. The embodiments are described below in order to explain the present invention by referring to the drawing figures.

A wireless communication method according to an embodiment of the present invention is to be adapted in a wireless personal area network (WPAN) based on IEEE 802.15.3 standard, but not limited to this network environment. If satisfying conditions of the present invention, other networks can adapt the wireless communication method.

According to an embodiment of the present invention, the wireless communication method classifies frames which are transmittable during a contention access period (CAP) of a superframe, into four classes. According to the classification, a class (0) is a request command frame of a piconet coordinator (PNC) in response to a communication request, a class (0) is a response command frame of a device (DEV), a class (3) is a request command frame, and a class (4) is a data frame.

Priority is assigned to each class in order of the class (0), the class (1), the class (2), and the class (3). For example, when simultaneously transmitting frames, the frame of the class (1) is transmitted prior to other frames of the other classes.

The classes for the priority are classified in a manner that the command frame has a higher priority than the data frame, to thus priorly transmit the control information. The response command frame is transmitted prior to the request command frame so that previous processes of the request and response are completed prior to a process start of new request and response, and also, a timeout of the processes of the previous request and response is reduced.

To assign each class for a different priority from each other, a backoff interframe space (BIFS), which is a wait time before backoff, is defined for and applied to each class.

According to the IEEE 802.15.3 standard, the BIFS is a kind of an interframe space (IFS) and awaits to determine whether a channel is busy or idle by any other DEV before performing the backoff. In addition to the BISF, the IFS also includes a short interframe space (SIFS) which is an interframe before transmitting an acknowledge (ACK) frame after receiving the response frame.

According to the IEEE 802.15.3 standard, the BIFS is defined to have the same value with respect to every frame. According to an embodiment of the present invention, BIFS (i) corresponding to each class i is differently defined and applied. The BIFS(i) is a BIFS value of the class (i) as shown in the following Equation 1.

$BIFS(0) = SIFS + 1 us = 11 \mu s$ $BIFS(1) = SIFS + CCA \text{ detect time} = 10 + 5*16/11 = 17.2 \mu s$ $BISF(i+1) = BIFS(i) + CW\min(n), i > 0$ [Equation 1]

In Equation 1, n denotes the number of DEVs within the WPAN. CWmin(n) denotes a contention window value and varies according to the CW(n,r) value. CW(n,r) denotes a contention window value at (r+1)-th transmission try with respect to the frame.

$CW(n,r) = 2^{\min[r+1,4]} * \log_2 n, i > 0$ $CW(n,r) = 0, i = 0$ [Equation 2]

In Equation 2, r denotes the number of the transmission try. A maximum value of r, that is, the total number of the re-transmission try is defined by the DEV. Referring to Equation 2, CW min(n)=CW(n,0)=2*log$_2$ n, wherein log$_2$ n is an exemplary function with respect to n. Other functions may be used which increase as n increases.

According to an embodiment of the present invention, when defining the CW, n which is the number of DEVs participated in the network, is considered. The PNC continually communicates with the DEVs accessed to the network and conveys information on each DEV to the DEVs. Hence, each DEV in the network knows the number of the network-accessed DEVs, and performs an algorithm for acquiring the CW value using the number of the network-accessed DEVs.

The CW is adjusted depending on the number of the DEVs participating in the network. Specifically, if the number of the DEVs is small, the CW value is adjusted to be low to reduce the backoff time. If the number of the DEVs is great, the CW value is adjusted to be high to reduce contention. Consequently, frame transmission delay is prevented.

Figure 3:
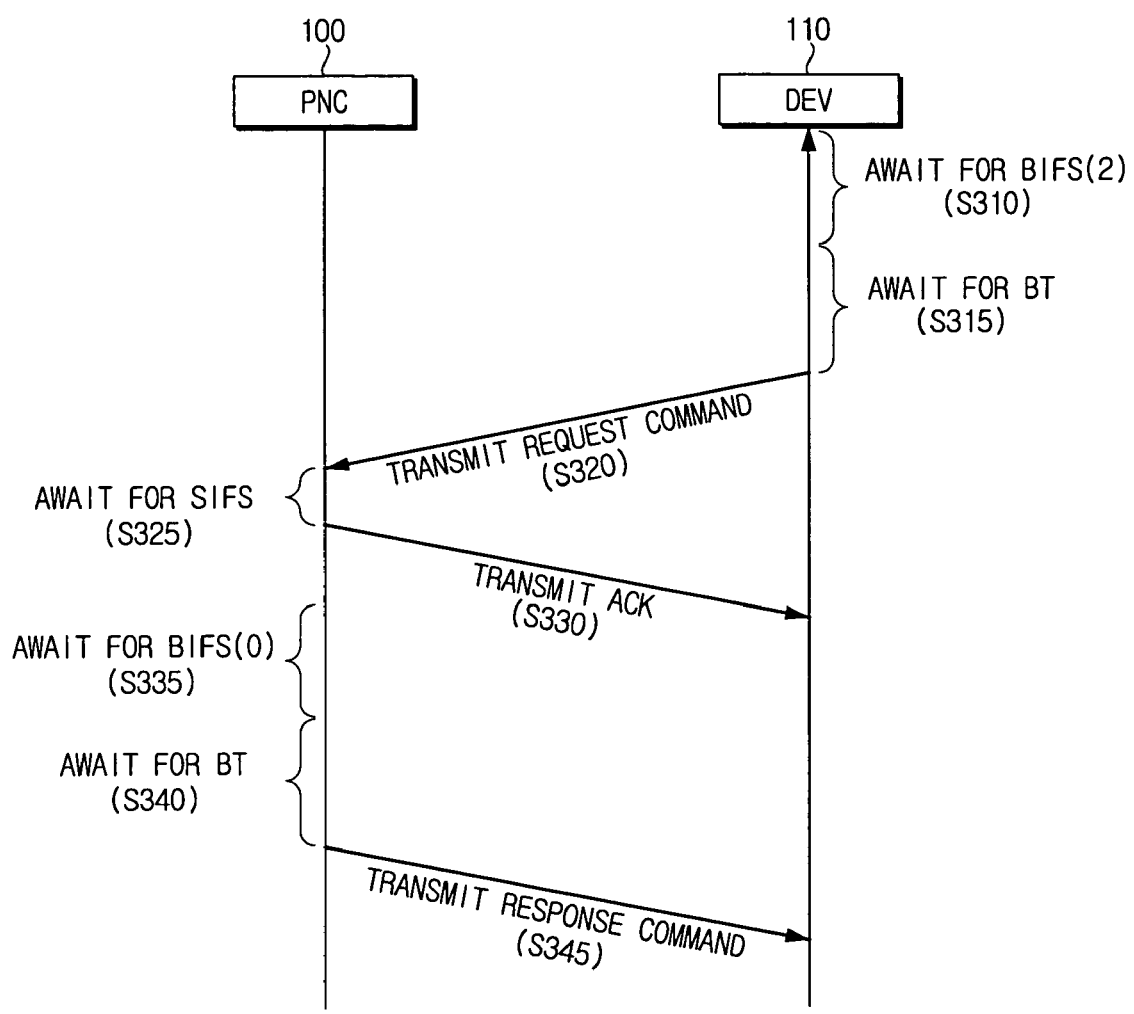
FIG. 3 is a message sequence chart (MSC) illustrating communications between a PNC and a DEV according to an embodiment of the present invention.
Figure 4:
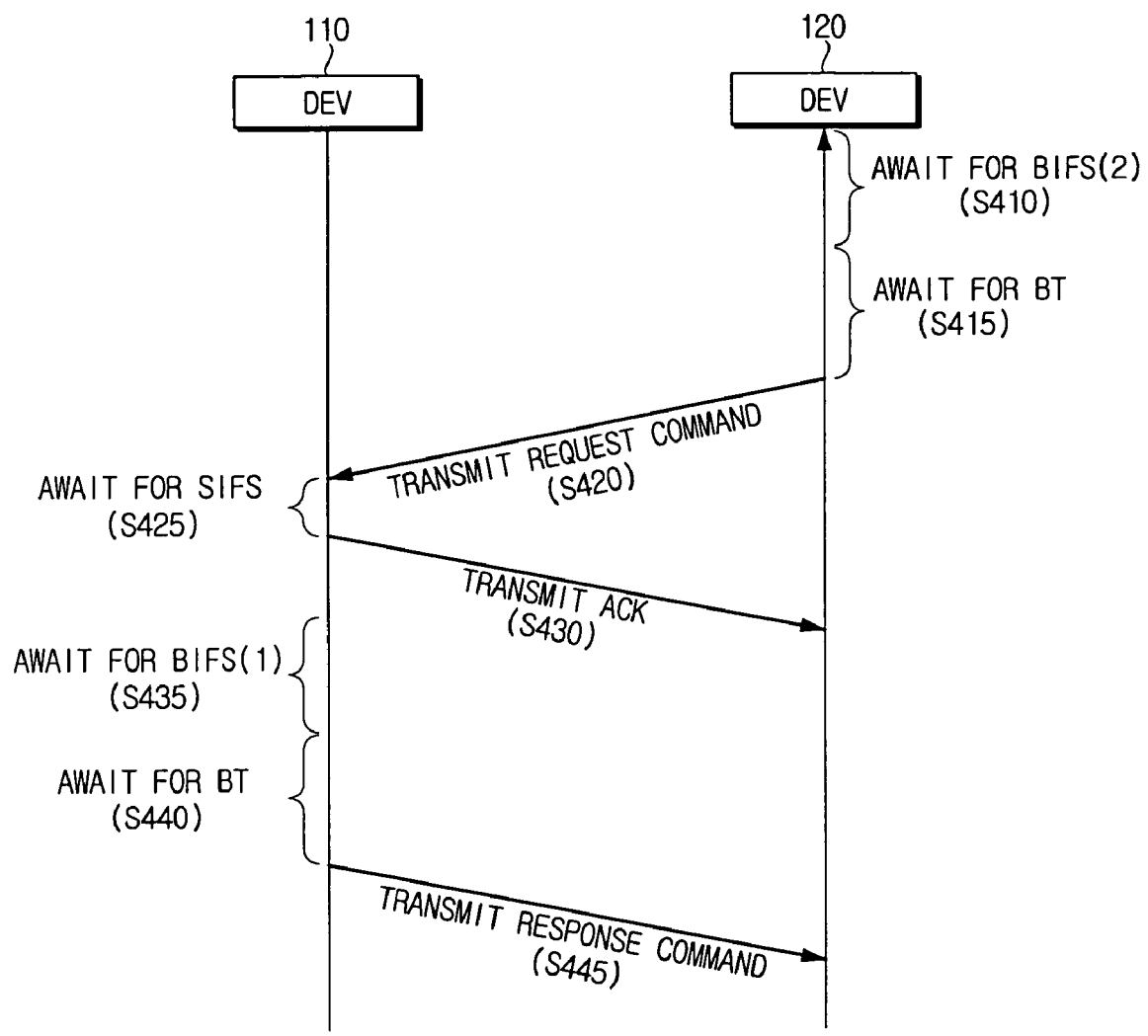
FIG. 4 is a MSC illustrating communications between either the DEV or the PNC and another DEV according to an embodiment of the present invention.

FIG. 3 is a message sequence chart (MSC) illustrating communications between the PNC 100 and the DEV 110 according to an embodiment of the present invention, and FIG. 4 is a MSC illustrating communications between either the DEV 110 or the PNC 100 and another DEV 120 according to an embodiment of the present invention.

Referring to FIG. 3, the DEV 110 awaits during a predetermined BIFS according to the class to which a frame to be transmitted is correspondent, and checks the channel status at step S310. The frame to be transmitted is, for example, a request command frame for requesting communications and belongs to the class (2). Hence, the DEV 110 awaits during BIFS(2)=BIFS(1)+CWmin(n), and determines whether the channel is used by any other DEV.

If the channel is idle during the BIFS(2), the DEV 110 awaits for the frame transmission by beginning the backoff at step S315. The backoff time (BT) is acquired based on the following Equation 3.

$$s = U[0, CW(n,r)-1], i > 0$$

$$s = 0, \text{ for } i = 0$$

slot time=SIFS+CCA detect time=17.2 μs  [Equation 3]

In Equation 3, U[0, CW(n,r)−1] is a function which selects a random value between '0' to CW(n,r)−1. If the channel is idle during the slot time, the backoff time is reduced as much as the slot time. If the channel is busy during the slot time, the backoff time is maintained as it is and the DEV 110 awaits. When the backoff time becomes '0', the DEV 110 transmits a related frame at step S320.

Upon receiving the request command frame, the PNC 100 awaits during the SIFS at step S325, and transmits the ACK at step S330. The SIFS is set to 10 μs by default. Subsequently, the PNC 100 awaits during BIFS(0)=SIFS+1 μs=11 μs at step S335 and checks the channel status. The frame transmitted from the PNC 100 is a response command frame in response to the previous request command frame, and belongs to the class(0).

If the channel is idle during BIFS(0), the PNC 100 begins the backoff. Accordingly, the PNC awaits during BT=slot time*s at step S340. By calculating the backoff time corresponding to the class(0) based on the Equation 3, s=0 and, accordingly, BT=0. Then, upon beginning the backoff, the PNC 100 immediately transmits the response command frame at step S345.

Referring now to FIG. 4, either the DEV 110 or the PNC 100 awaits during a predetermined BIFS according to a related class to which a frame to be transmitted is correspondent for communications with another DEV 120, and checks the channel status at step S410. The frame to be transmitted is, for example, is a request command frame and belongs to the class (2). Hence, the DEV 120 awaits during BIFS(2)=BIFS(1)+CW min(n) and determines whether the channel is used by other DEVs.

If the channel is idle during the BIFS(2), the DEV 120 awaits for the frame transmission by beginning the backoff at step S415, in which the BT is acquired using BT=slot time*s and Equation 3.

If the channel is idle during the slot time, the BT is reduced as much as the slot time. If the channel is busy during the slot time, the BT value is maintained as it is and the DEV 120 awaits. When the BT becomes '0', the DEV 120 transmits the related frame at step S420.

Upon receiving the request command frame, the DEV 110 awaits during the SIFS at step S425, and transmits the ACK at step S430. Subsequently, the DEV 120 awaits during BIFS (1)=SIFS+CCA detect time=17.2 μs before performing the backoff at step S435, and checks the channel status. The frame transmitted from the DEV 110 is the response command frame in response to the previous request command frame, and belongs to the class (1). CCA detect time is set to 5*16/11 by default.

If the channel is idle during BIFS(1), the DEV 110 begins the backoff performance. That is, the DEV 110 awaits during BT=slot time*s at step S440. By calculating the BT corresponding to the class (1) based on Equation 3, s=U[0, CW(n, r)−1] and, accordingly, BT=slot time*s. When the BT ends, the DEV 110 transmits the response command frame at step S445.

In the light of the foregoing, the priority is adapted to the CAP of the superframe in the WPAN compliant to the IEEE 802.15.3 standard so as to swiftly convey the control information and enable high rate communications.

The wireless communication method according to an embodiment of the present invention calculates the CW in consideration of the number of DEVs in the network when calculating the interframe space and the backoff wait time depending on the priority, to thus provide an effective collision avoidance.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A wireless communication method in a network in which a plurality of devices are connected and wireless communications are performed through a channel synchronized by a sync signal that is broadcast from one of the plurality of devices, the method comprising:

classifying a first frame to be transmitted from a first device among the plurality of the devices into one of a predetermined number of classes;

calculating a waiting time before backoff depending on the classified class of the first frame and a number of the devices that are connected to the network, and determining whether the channel is used by any other device during the calculated waiting time;

if the channel is idle during the waiting time, then calculating a backoff time according to the classified class and the number of the devices that are connected to the network and performing the backoff during the calculated backoff time; and transmitting the first frame when the backoff time ends.

2. The method of claim 1, wherein the network is a high-rate wireless personal area network (WPAN) compliant to one of an IEEE 802.15.3 standard and an IEEE 802.15.3a standard.

3. The method of claim 2, wherein the class is classified based on the first frame to be transmitted during a contention access period (CAP) of a superframe and a type of the first device.

4. The method of claim 3, wherein the first frame is assigned a higher priority class when the first frame corresponds to a command frame conveying a control information than when the first frame corresponds to a data frame.

5. The method of claim 3, wherein the first frame is assigned a higher priority class when the first frame corresponds to a response command frame of the command frame conveying the control information than when the first frame corresponds to a request command frame.

6. The method of claim 3, wherein the predetermined number of classes, in a descending priority, comprises:
   a first class in which the first device is a piconet coordinate (PNC) and the first frame is a response command frame;
   a second class in which the first device is not the PNC and the first frame is the response command frame;
   a third class in which the first frame is the request command frame; and
   a fourth class in which the first frame is the data frame.

7. The method of claim 6, wherein the waiting time is acquired as follows:

$$BIFS(0)=SIFS+\alpha$$

$$BIFS(1)=SIFS+CCA \text{ detect time}$$

$$BIFS(i+1)=BIFS(i)+CW\min(n), i>0,$$

where BIFS(i) denotes a waiting time corresponding to the (i+1)-th class, CW min(n) denotes a contention window (CW) value at an initial transmission of the first frame, which is CW min(n)=CW(n,r) where r→0, r denotes a number of the frame retransmission try, α denotes a certain value, SIFS and CCA detect time denote a predetermined value, and n denotes the number of the devices.

8. The method of claim 6, wherein the backoff time is acquired as follows:

$$BT=\text{slot time}*s$$

$$s=U[0,CW(n,r)-1], i>0$$

$$s=0, \text{ for } i=0$$

slot time=SIFS+CCA detect time, where BT denotes the backoff time, U[0,CW(n,r)−1] denotes a random value between 0 to CW (n,r)−1, CW (n,r) denotes a contention window (CW) value, SIFS and CCA detect time denote a certain value, and a slot time denotes a predetermined value.

9. The method of claim 7, wherein the CW value is acquired as follows:

$$CW(n,r)=2^{\min[r+1,4]}*f(n), i>0$$

$$CW(n,r)=0, i=0,$$

where a maximum value of r is defined by the device, and f(n) denotes a function which increases according to an increase of n.

10. The method of claim 8, wherein the CW value is acquired as follows:

$$CW(n,r)=2^{\min[r+1,4]}*f(n), i>0$$

$$CW(n,r)=0, i=0,$$

where a maximum value of r is defined by the device, and f(n) denotes a function which increases according to an increase of n.

11. The method of claim 2, wherein a waiting time is calculated so that the correspondent waiting time is lengthened as the assigned priority class decreases.

12. The method of claim 2, wherein the Backoff Time (BT) is calculated so that the correspondent Backoff Time (BT) is lengthened as the assigned priority class decreases.

13. The method of claim 10, wherein at least one of the waiting time and the Backoff Time (BT) is lengthened as the number of the devices accessed to the network increases.

14. The method of claim 11, wherein at least one of the waiting time and the Backoff Time (BT) is lengthened as the number of the devices accessed to the network increases.

15. The method of claim 1, wherein the sync signal is broadcast from a piconet coordinate (PNC) selected among the plurality of devices.

* * * * *